United States Patent
Kawahara et al.

(10) Patent No.: US 11,979,226 B2
(45) Date of Patent: May 7, 2024

(54) WAVELENGTH CROSS CONNECT DEVICE AND WAVELENGTH CROSS CONNECT METHOD

(71) Applicant: Nippon Telegraph and Telephone Corporation, Tokyo (JP)

(72) Inventors: Hiroki Kawahara, Musashino (JP); Takeshi Seki, Musashino (JP); Sachio Suda, Musashino (JP); Kohei Saito, Musashino (JP); Kenta Hirose, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 12 days.

(21) Appl. No.: 17/794,347

(22) PCT Filed: Feb. 4, 2020

(86) PCT No.: PCT/JP2020/004101
§ 371 (c)(1),
(2) Date: Jul. 21, 2022

(87) PCT Pub. No.: WO2021/156933
PCT Pub. Date: Aug. 12, 2021

(65) Prior Publication Data
US 2023/0067932 A1    Mar. 2, 2023

(51) Int. Cl.
*H04J 14/02* (2006.01)
*H04Q 11/00* (2006.01)
(Continued)

(52) U.S. Cl.
CPC ...... *H04J 14/0212* (2013.01); *H04Q 11/0005* (2013.01); *H04Q 11/0062* (2013.01);
(Continued)

(58) Field of Classification Search
CPC .... H04J 14/0212; H04J 14/0213; H04J 14/02; H04Q 11/0005; H04Q 11/0062;
(Continued)

(56) References Cited

U.S. PATENT DOCUMENTS 6,501,597 B1 * 12/2002 Pitt ..................... H01S 3/06775
359/333
6,509,987 B1 * 1/2003 Hunziker ............. H04B 10/291
398/79

(Continued)

OTHER PUBLICATIONS

Napoli et al., "Perspectives of Multi-band Optical Communication Systems," The 23rd OptoElectronics and Communications Conference (OECC 2018) Technical Digest, Jul. 2, 2018, 2 pages.

*Primary Examiner* — Dibson J Sanchez
(74) *Attorney, Agent, or Firm* — Fish & Richardson P.C.

(57) ABSTRACT

A wavelength cross-connect device performs relay processing, the relay processing being such that wavelength multiplexed signal lights, which are multiband transmitted from a plurality of routes, are demultiplexed into different wavelength bands, and for each route, respective optical signals of the different wavelength bands are amplified, then subject to route change by WSSs and outputted to output side routes M. The device includes C-band WXC units that are the same in total number as the wavelength bands of the optical signals of the respective wavelength bands and perform relay processing on optical signals of a specific wavelength band of the different wavelength bands.

6 Claims, 6 Drawing Sheets

(51) Int. Cl.
*H04B 10/29* (2013.01)
*H04B 10/291* (2013.01)

(52) U.S. Cl.
CPC ............ *H04B 10/29* (2013.01); *H04B 10/291* (2013.01); *H04J 14/02* (2013.01); *H04Q 2011/0011* (2013.01); *H04Q 2011/0016* (2013.01); *H04Q 2011/0083* (2013.01)

(58) Field of Classification Search
CPC ... H04Q 2011/0016; H04Q 2011/0083; H04Q 2011/0011; H04B 10/291; H04B 10/29
USPC .................................. 398/43–103, 173–181
See application file for complete search history.

(56) References Cited

U.S. PATENT DOCUMENTS

| | | | | |
|---|---|---|---|---|
| 10,903,930 | B1* | 1/2021 | Moore ................. | H04J 14/021 |
| 2002/0015551 | A1* | 2/2002 | Tsuyama ............ | H04Q 11/0005 398/4 |
| 2004/0165816 | A1* | 8/2004 | Oikawa .............. | H04Q 11/0005 385/24 |
| 2004/0165818 | A1* | 8/2004 | Oikawa .............. | H04Q 11/0005 385/24 |
| 2005/0117837 | A1* | 6/2005 | Cerato ................ | G02B 6/3566 385/17 |
| 2010/0221021 | A1* | 9/2010 | Onaka ................. | H04B 10/671 398/208 |
| 2013/0279908 | A1* | 10/2013 | Jenkins .............. | H04J 14/0212 398/83 |
| 2018/0234749 | A1* | 8/2018 | Chedore ............ | H04Q 11/0005 |
| 2019/0109666 | A1* | 4/2019 | Kato .................. | H04J 14/0256 |
| 2019/0349112 | A1* | 11/2019 | Seno ................... | H04B 10/548 |
| 2019/0349113 | A1* | 11/2019 | Komiya .............. | H04J 14/0221 |
| 2019/0386767 | A1* | 12/2019 | Yuki ................... | H04B 10/572 |
| 2020/0059313 | A1* | 2/2020 | Kato .................. | H01S 3/06766 |
| 2020/0274633 | A1* | 8/2020 | Yuki ................... | H04J 14/0256 |
| 2021/0263218 | A1* | 8/2021 | Robertson ................ | G02F 1/29 |

* cited by examiner

--Prior Art--

WAVELENGTH CROSS CONNECT DEVICE AND WAVELENGTH CROSS CONNECT METHOD

CROSS-REFERENCE TO RELATED APPLICATIONS

This application is a National Stage application under 35 U.S.C. § 371 of International Application No. PCT/JP2020/004101, having an International Filing Date of Feb. 4, 2020. The disclosure of the prior application is considered part of the disclosure of this application, and is incorporated by reference in its entirety into this application.

TECHNICAL FIELD

The present invention relates to a wavelength cross-connect device and a wavelength cross-connect method, which are used in multiband transmission for transmitting wavelength multiplexed signal lights, in which optical signals of a plurality of different wavelength bands are multiplexed, with optical fibers.

BACKGROUND ART

The wavelength cross-connect device used in a multiband transmission system is the optical node for connection between arbitrary routes in an optical network, for the optical transmission line configured by one or a plurality of optical fibers that transmit wavelength multiplexed signal lights in which respective optical signals of a plurality of different wavelength bands are multiplexed. In this wavelength cross-connect device, the wavelength multiplexed signal lights transmitted from input side routes are output to output side routes, via a plurality of WSSs (Wavelength Selective Switches).

FIG. 6 illustrates the configuration of a wavelength cross-connect device 20 used in a conventional multiband transmission system (also referred to as a system) 10.

The system 10 includes M wavelength band demultiplexers (which may also be referred to as demultiplexers) 11a, 11b, ..., and 11m connected, on the input side, for each of M routes indicated by sign M(1), and M wavelength band multiplexers (which may also be referred to as multiplexers) 12a, 12b, ..., and 12m connected, on the output side, for each of M routes indicated by reference sign M(2). In addition, the system 10 includes the wavelength cross-connect device 20 arranged between the demultiplexers 11a to 11m and the multiplexers 12a to 12m, which includes an S-band WXC (Wavelength Cross Connect) unit 21, a C-band WXC unit 22, and an L-band WXC unit 23 connected via optical fibers. The S-band WXC unit 21, the C-band WXC unit 22, and the L-band WXC unit 23 may also be referred to as WXC units 21 to 23.

As represented by the L-band WXC unit 23 in FIG. 6, each of the WXC units 21 to 23 includes M optical amplifiers 24a, 24b, ..., and 24m and M WSSs 25a, 25b, ..., and 25m on the input side. Each of the WSS 25a to 25m has one input terminal and M output terminals (1×M). Further, the L-band WXC unit 23 includes, on the output side, M WSSs 26a, 26b, ..., and 26m each having M input terminals and one output terminal (M×1), and M optical amplifiers 27a, 27b, ..., and 27m. Respective elements of the optical amplifiers 24a to 24m, the WSSs 25a to 25m, the WSSs 26a to 26m, and the optical amplifiers 27a to 27m are connected via optical fibers or optical waveguides.

Further, similar to the above-described L-band WXC unit 23, optical amplifiers 24a to 24m, WSSs 25a to 25m, WSSs 26a to 26m, and optical amplifiers 27a to 27m are also provided in the S-band WXC unit 21 and the C-band WXC unit 22, although not illustrated in the drawings.

Wavelength multiplexed signal lights 1a, 1b, ..., and 1m multiband transmitted for each of the M routes on the input side are input to the demultiplexers 11a to 11m in the following manner. That is, the wavelength multiplexed signal light ha is input to the demultiplexer 11a. The wavelength multiplexed signal light 1ba is input to the demultiplexer 11b. The wavelength multiplexed signal light 1m is input to the demultiplexer 11m.

Here suppose that each of the wavelength multiplexed signal lights ha to 1m is the one in which respective optical signals of S band, C band, and L band, which are wavelength bands described below, are multiplexed. Respective wavelength bands are, in order from the short wavelength side, S band of 1460 nm to 1530 nm, C band of 1530 nm to 1565 nm, and L band of 1565 nm to 1625 nm. Respective optical signals of S band, C band, and L band are allocated to S bandwidth, C bandwidth, and L bandwidth of optical fibers serving as routes, at the time of transmission.

In FIG. 6, "S", "C", and "L" on transmission paths of optical signals indicate that the optical signals are S band, C band, and L band, respectively.

The demultiplexer 11a demultiplexes the wavelength multiplexed signal light 1a into respective optical signals of S band, C band, and L band, and outputs them to the optical amplifiers 24a of respective WXC units 21 to 23. That is, the demultiplexer 11a outputs the demultiplexed S-band optical signal to the optical amplifier 24a of the S-band WXC unit 21, outputs the C-band optical signal to the optical amplifier 24a of the C-band WXC unit 22, and outputs the L-band optical signal to the optical amplifier 24a of the L-band WXC unit 23.

Even in other demultiplexers 11b to 11m, similar to the above-described demultiplexer 11a, the wavelength multiplexed signal lights 1b to 1m are demultiplexed into respective optical signals of S band, C band, and L-band and output to the optical amplifiers 24b to 24m of respective WXC units 21 to 23.

The optical amplifiers 24a to 24m of respective WXC units 21 to 23 amplify respective optical signals of S band, C band, and L band and output them to the WSSs 25a to 25m of respective WXC units 21 to 23.

Each of the WSSs 25a to 25m has a function of selecting the optical signal of each wavelength band and adjusting the amount of attenuation. M output terminals provided in each of the WSSs 25a to 25m are connected to M input terminals of the WSSs 26a to 26m on the output side.

For example, the WSS 25a outputs the L-band optical signal from a first output terminal described at the uppermost portion thereof to a second input terminal of the WSS 26a on the output side, outputs the L-band optical signal from a second output terminal to an input terminal of an WSS (not illustrated) on the output side, and outputs the L-band optical signal from a third output terminal to a first input terminal of the WSS 26m on the output side. In this manner, the L-band optical signal is output from each output terminal of one WSS 25a to an input terminal of other WSSs 26a to 26m.

Each of the WSSs 26a to 26m on the output side sequentially selects the optical signals of the plurality of wavelength bands input from the M input terminals and outputs them from one output terminal to the optical amplifiers 27a to 27m.

Output terminals of respective optical amplifiers 27a to 27m are connected to the multiplexers 12a to 12m. With this configuration, after amplifying respective optical signals of S band, C band, and L band, the optical amplifiers 27a to 27m outputs them to the corresponding multiplexers 12a to 12m. After this output, respective multiplexers 12a to 12m multiplex respective optical signals of S band, C band, and L-band amplified by the optical amplifiers 27a to 27m of respective WXC units 21 to 23. The wavelength multiplexed signal light through this multiplexing is multiband transmitted to the M routes M(2).

As a conventional technique relating to the wavelength cross-connect device 20 having the above-described arrangement, there is the one disclosed in Non-Patent Literature 1.

CITATION LIST

Non-Patent Literature

Non-Patent Literature 1: A. Napoli et al., "Perspectives of Multiband Optical Communication Systems," OECC2018, 5B3-1, July 2018.

SUMMARY OF THE INVENTION

Technical Problem

The above-described wavelength cross-connect device 20 supports multiband transmission, and is required to include the S-band WXC unit 21, the C-band WXC unit 22, and the L-band WXC unit 23 corresponding to respective optical signals of S band, C band, and L-band demultiplexed by the demultiplexer 11a. For this reason, the increase in each of device scale and power consumption is three times or more compared with a single-band compliant wavelength cross-connect device.

Further, in the configuration of respective WXC units 21 to 23, there are differences in optical properties due to differences in wavelength band between the S band, C band, and L band. Therefore, transmission performances differ between respective optical signals of S band, C band, and L band. For example, in the WSSs and the optical amplifiers, wavelength band dependency occurs in transmission band or optical loss.

Further, depending on the wavelength band, constituent components used in an optical device such as the WSSs and the optical amplifiers of respective WXC units 21 to 23 are different in technical maturity level. When the technical maturity period for improving optical components or the like required to ensure a certain level of optical performances (transmission band, optical loss, etc.) differs depending on the wavelength band, the realization time of the multiband compliant WXC is rate-determined by the technical maturity of the optical device in a wavelength band in which the technical maturity period is most required. For example, the technical maturity level of optical devices is highest in the C band which is most often applied to general optical transmission systems and decreases in the order of the L band and the S band. For this reason, there is a problem that the realization of the S-band optical device that requires the technical maturity period rate-determines the realization time of the multiband compliant WXC.

In view of such circumstances, the present invention has been made and intends to enable reduction in device scale and power consumption, eliminate differences in transmission performances of respective optical signals due to different wavelength bands of the WXC, and prevent the realization time of the multiband compliant WXC from being rate-determined by the optical device of the wavelength band that requires the most technical maturity period.

Means for Solving the Problem

To solve the above-described problem, a wavelength cross-connect device of the present invention is provided wherein the wavelength cross-connect device performs relay processing, the relay processing being such that wavelength multiplexed signal lights, in which optical signals of a plurality of different wavelength bands are multiplexed and which are multiband transmitted via the optical transmission line configured by one or a plurality of optical fibers, are demultiplexed into different wavelength bands, and for each route, respective optical signals of the different wavelength bands are amplified, then subject to route change by WSSs (Wavelength Selective Switches) and outputted to output side routes. The device includes WXC (Wavelength Cross Connect) units that are the same in total number as the wavelength bands of the optical signals of respective wavelength bands, have the optical amplifiers and the WSSs, and perform the relay processing on optical signal of a predetermined specific wavelength band of the different wavelength bands. The device includes input side conversion units provided on the input side of the WXC units for converting optical signals of wavelength bands other than the specific wavelength band into optical signals of the specific wavelength band. The device includes output side conversion units provided on the output side of the WXC units for converting the optical signals of the specific wavelength band converted by the input side conversion units into before-conversion optical signals. The optical signals of the specific wavelength band directly input from the input side are directly output after relay processing by the WXC units.

Effects of the Invention

The present invention enables reduction in device scale and power consumption, eliminates differences in transmission performances of respective optical signals due to different wavelength bands of the WXC, and prevents the realization time of the multiband compliant WXC from being rate-determined by the optical device of the wavelength band that requires the most technical maturity period.

DESCRIPTION OF EMBODIMENTS

Hereinafter, embodiments of the present invention will be described with reference to the drawings. However, functionally corresponding constituent components are denoted by the same reference signs in all the drawings of the present specification and the description thereof will be omitted appropriately.

Configuration of Embodiment

Figure 1:
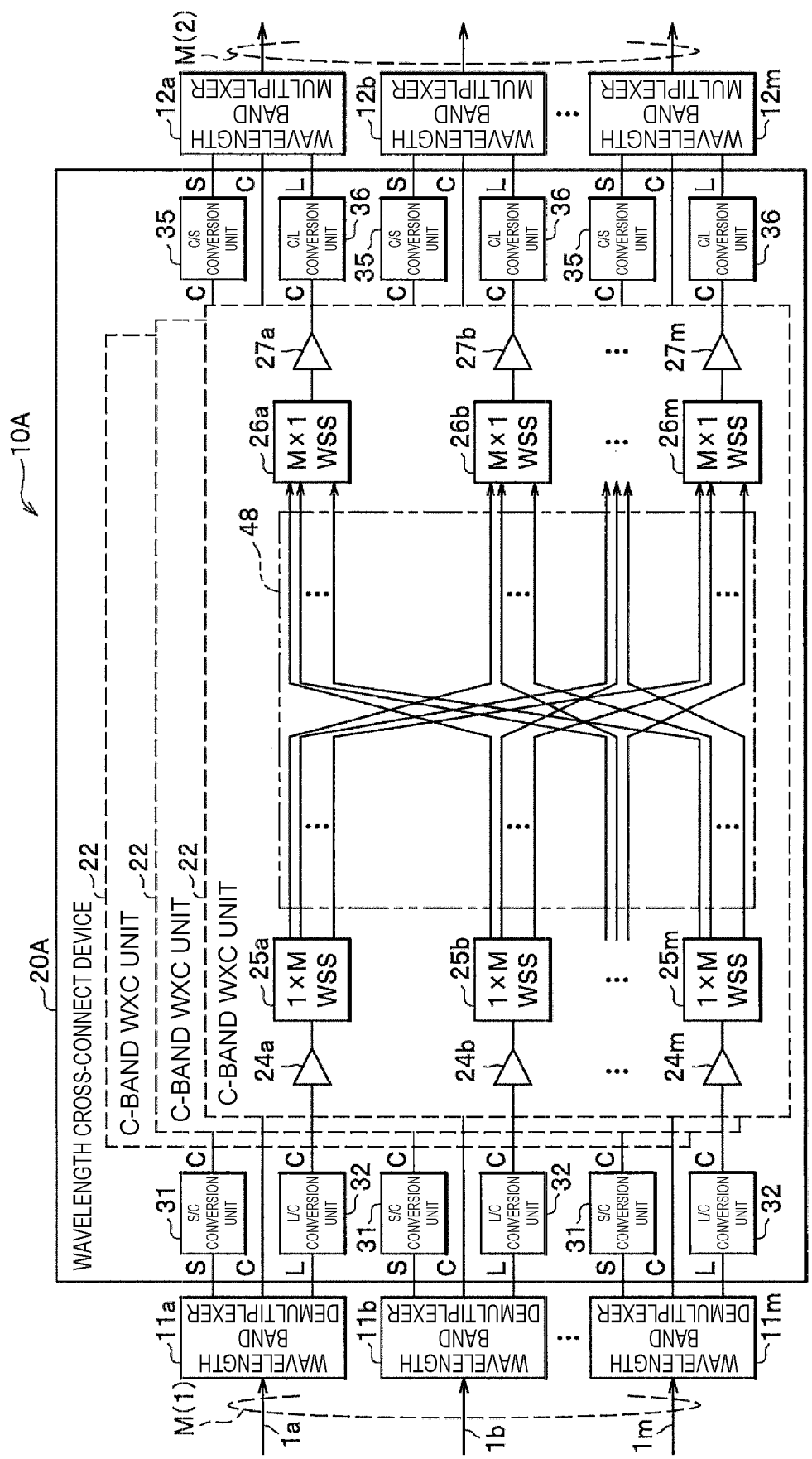
FIG. 1 is a block diagram illustrating the configuration of a multiband transmission system using a wavelength cross-connect device according to an embodiment of the present invention.

FIG. 1 is a block diagram illustrating the configuration of a multiband transmission system using a wavelength cross-connect device according to an embodiment of the present invention.

Figure 6:
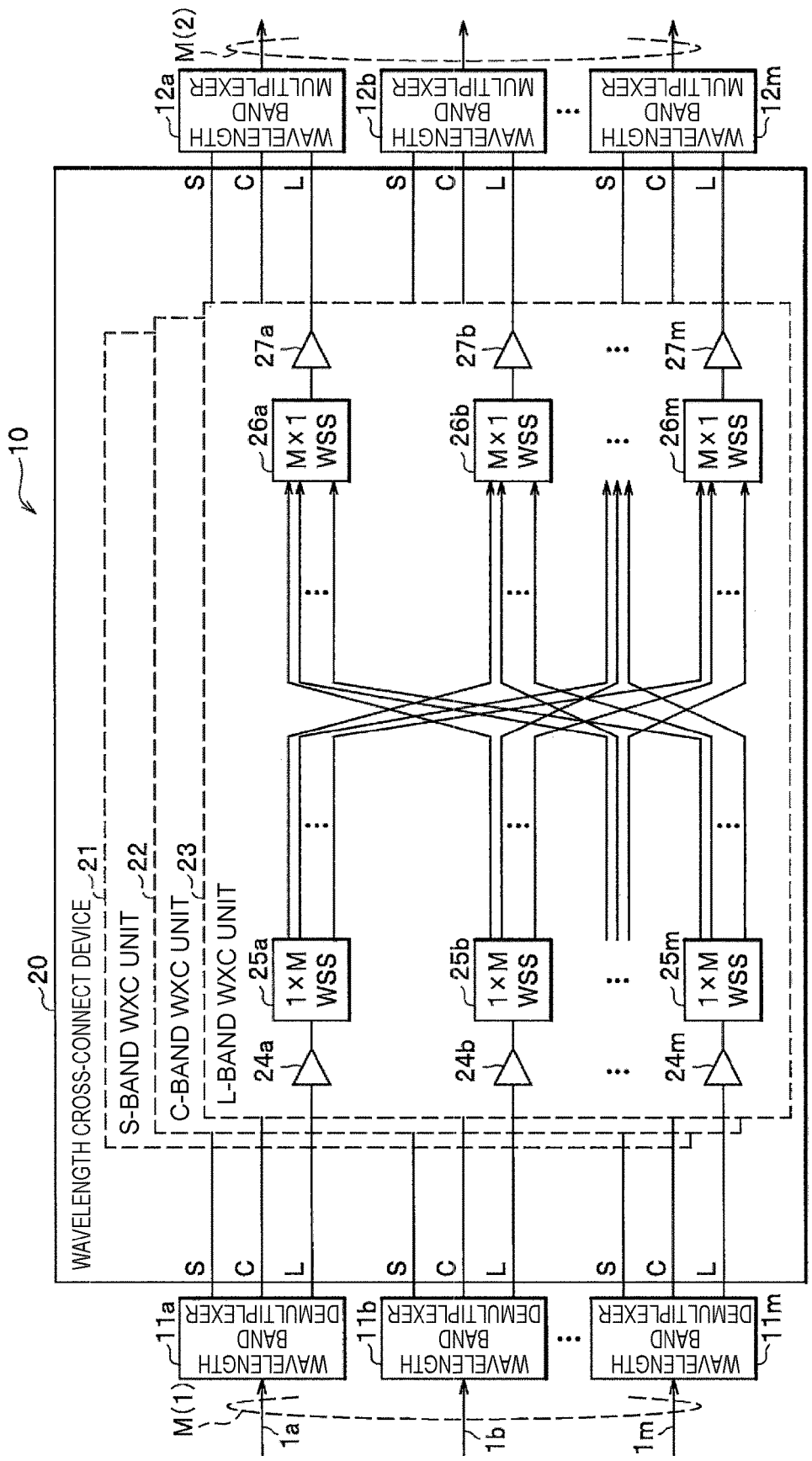
FIG. 6 is a block diagram illustrating the configuration of a multiband transmission system using a conventional wavelength cross-connect device.

Features of a wavelength cross-connect device 20A applied to a multiband transmission system 10A of the embodiment illustrated in FIG. 1, which are different from those of the conventional wavelength cross-connect device 20 (FIG. 6), will be described.

The wavelength cross-connect device 20A includes C-band WXC units 22 whose total number is the same as the number of wavelength bands demultiplexed for each of wavelength band demultiplexers 11a to 11m. The C-band WXC unit 22 relates to the C band that is the wavelength band highest in the technical maturity level (referred to as specific wavelength band) of the above-described WXC constituent elements. In this example, it is supposed that the number of wavelength bands is three of S band, C band, and L band. In this case, the device is configured so as to include three C-band WXC units 22. The C-band WXC units 22 configure WXC units in Claim.

The wavelength cross-connect device 20A includes, on the input side, S/C conversion units 31 and L/C conversion units 32 as wavelength band conversion units for converting optical signals of wavelength bands (S band and L band) other than the specific wavelength band (C band) into optical signals of the specific wavelength band (C band). The S/C conversion units 31 convert S-band optical signals into C-band optical signals. The L/C conversion units 32 convert L-band optical signals into C-band optical signals. The S/C conversion units 31 and the L/C conversion units 32 configure input side conversion units in Claim.

The configuration for connecting respective output terminals of the demultiplexers 11a to 11m to input terminals of the three C-band WXC units 22 are as follows. That is, S-band optical signal output terminals of the demultiplexers 11a to 11m are connected, via the S/C conversion unit 31, to the optical amplifiers 24a to 24m of the first C-band WXC unit 22. Further, C-band optical signal output terminals of the demultiplexers 11a to 11m are directly connected to input terminals of the optical amplifiers 24a to 24m in the second C-band WXC unit 22. Moreover, L-band optical signal output terminals of the demultiplexers 11a to 11m are connected, via the L/C conversion unit 32, to input terminals of the optical amplifiers 24a to 24m of the third C-band WXC unit 22.

Further, the wavelength cross-connect device 20A includes, on the output side, C/S conversion units 35 and C/L conversion units 36 connected to optical amplifiers 27a to 27m. FIG. 1 representatively illustrates the C/L conversion units 36 connected to the optical amplifiers 27a to 27m. The C/S conversion unit 35 converts the C-band optical signal, which has been converted from the S-band optical signal by the S/C conversion unit 31 on the input side, into an S-band optical signal. The C/L conversion unit 36 includes the C/L conversion unit 36 that converts the C-band optical signal, which has been converted from the L-band optical signal by the L/C conversion unit 32 on the input side, into an L-band optical signal. The C/S conversion unit 35 and the C/L conversion unit 36 configure output side conversion units in Claim.

Further, in the C-band WXC unit 22, output terminals of the directly input C-band optical signals are directly connected to input terminals of the multiplexers 12a to 12m.

<Configuration of Wavelength Band Conversion Unit>

The S/C conversion units 31, the L/C conversion units 32, the C/S conversion units 35, and the C/L conversion units 36 described above are substantially the same in circuit configuration. For this reason, FIG. 2 representatively illustrates the circuit configuration of the L/C conversion unit 32, and a description thereof will be given.

Figure 2:
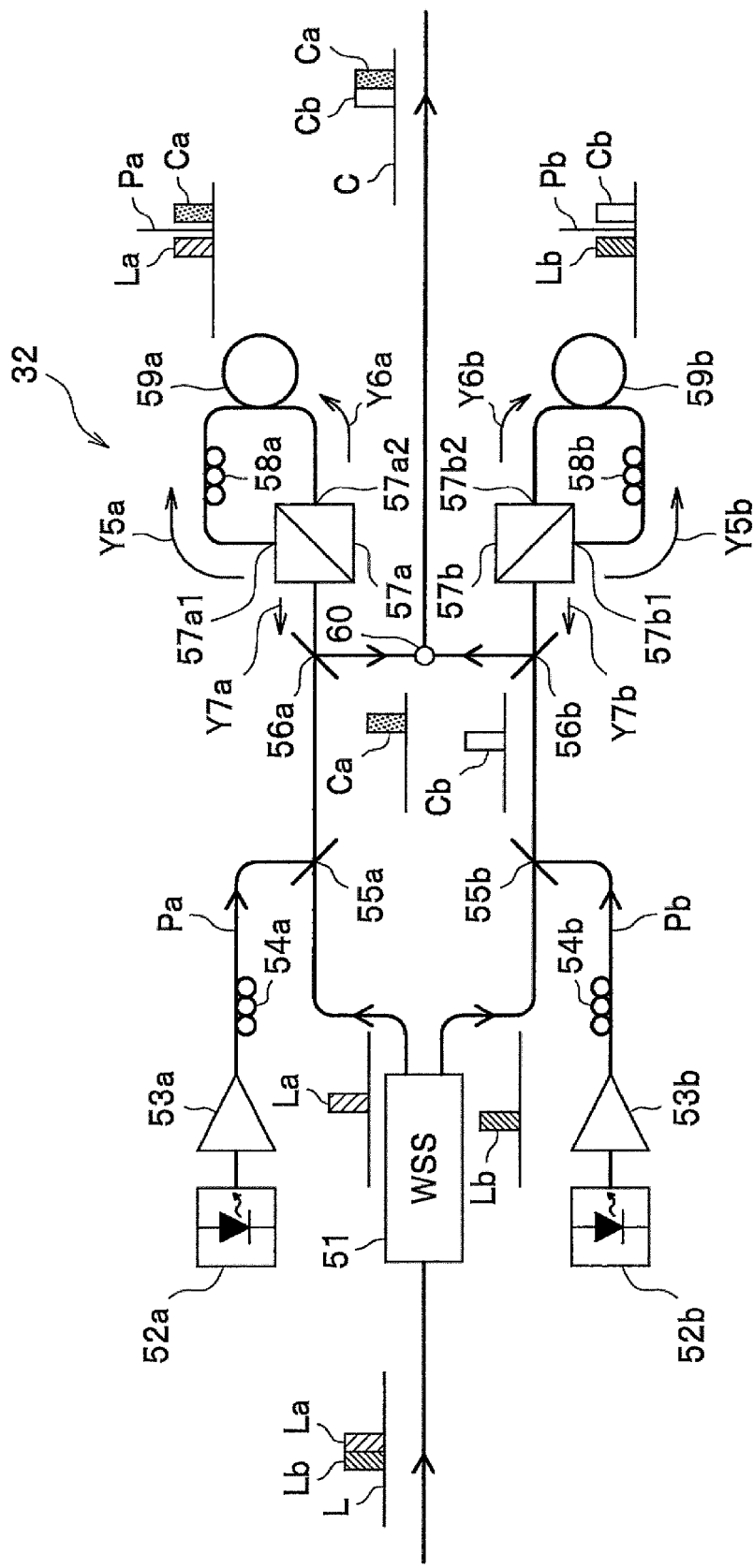
FIG. 2 is a block diagram illustrating the configuration of an L/C conversion unit of the embodiment.

The L/C conversion unit 32 illustrated in FIG. 2 is configured so as to include a WSS 51, wavelength tunable light sources 52a and 52b, amplifiers 53a and 53b, polarization controllers 54a and 54b, WDM (Wavelength Division Multiplexing) couplers 55a, 55b, 56a, and 56b, polarization beam splitters 57a and 57b, polarization controllers 58a and 58b, loop-shaped high nonlinear fibers 59a and 59b, and an optical coupler 60.

Regarding reference signs 52a to 59b, "a" indicates a constituent element on the long wavelength side of the optical signal, and "b" indicates a constituent element on the short wavelength side of the optical signal.

The polarization beam splitter 57a has two input/output ports 57a1 and 57a2, which are connected in a loop shape with an optical fiber. The loop-shaped high nonlinear fiber 59a is connected in the middle of this optical fiber. The polarization controller 58a is connected between one input/output port 57a1 of the polarization beam splitter 57a and the high nonlinear fiber 59a.

Similarly, the polarization beam splitter 57b has two input/output ports 57b1 and 57b2, which are connected in a loop shape with an optical fiber. The loop-shaped high nonlinear fiber 59b is connected in the middle of this optical fiber. The polarization controller 58b is connected between one input/output port 57b1 of the polarization beam splitter 57b and the high nonlinear fiber 59b.

First, the pump beam output from the wavelength tunable light source 52a is amplified by the amplifier 53a and is polarization controlled by the polarization controller 54a as a pump beam Pa, which is then input to the polarization beam splitter 57a via the WDM couplers 55a and 56a. At the time of entering the polarization beam splitter 57a, the pump beam Pa is in a linearly polarized state inclined by 45 degrees with respect to the principal axis of the polarization beam splitter 57a. The inclination of 45 degrees can be realized by the polarization control of the polarization controller 54a.

Similarly, the pump beam output from the wavelength tunable light source 52b is amplified by the amplifier 53b and is polarization controlled by the polarization controller 54b as a pump beam Pb, which is then input to the polarization beam splitter 57b via the WDM couplers 55b and 56b. At the time of entering the polarization beam splitter 57b, the pump beam Pb is in a linearly polarized state inclined by 45 degrees with respect to the principal axis of the polarization beam splitter 57b. The inclination of 45 degrees can be realized by the polarization control of the polarization controller 54b.

On the other hand, suppose that the L-band optical signal (which may also be referred to as optical signal L) is input from the demultiplexer 11a illustrated in FIG. 1 to the WSS 51 of the L/C conversion unit 32 illustrated in FIG. 2. In this optical signal L, the optical signal on the long-wavelength side La (which may also be referred to as a long-wavelength side optical signal La) and the optical signal on the short wavelength side Lb (which may also be referred to as a short-wavelength side optical signal Lb) are multiplexed.

The WSS 51 divides the optical signal L into the long-wavelength side optical signal La and the short-wavelength side optical signal Lb and outputs these signals. The long-wavelength side optical signal La is input to the polarization beam splitter 57a via the WDM couplers 55a and 56a. The short-wavelength side optical signal Lb is input to the polarization beam splitter 57b via the WDM couplers 55b and 56b.

On the long-wavelength side having the above-described configuration, the long-wavelength side optical signal La and the pump beam Pa input to the polarization beam splitter 57a are output from the first input/output port 57a1 of the polarization beam splitter 57a and are input to the second input/output port 57a2 following the loop path passing through the polarization controller 58a and the high nonlinear fiber 59a, as indicated by an arrow Y5a.

In this loop path, the long-wavelength side optical signal La and the pump beam Pa output from the first input/output port 57a1 of the polarization beam splitter 57a are subjected to four light-wave mixing processing (described below) in the high nonlinear fiber 59a while they are polarization controlled by the polarization controller 58a. The high nonlinear fiber 59a is an optical fiber that is set to be higher in non-linear constant as a parameter, and effectively causes four light-wave mixing in the loop to perform wavelength band conversion.

That is, the high nonlinear fiber 59a causes two wavelength bands of the long-wavelength side optical signal La and the pump beam Pa to interact with each other, as a non-linear optical intermodulation phenomenon due to the four light-wave mixing processing, and newly generates a long-wavelength side optical signal Ca of C-band, which is one wavelength band. The optical signal Ca generated in this manner, the long-wavelength side optical signal La, and the pump beam Pa are input to the second input/output port 57a2 of the polarization beam splitter 57a.

At the same time as this operation, the long-wavelength side optical signal La and the pump beam Pa input to the polarization beam splitter 57a are output from the second input/output port 57a2 and are input to the first input/output port 57a1 via the high nonlinear fiber 59a and the polarization controller 58a following the loop path, as indicated by an arrow Y6a opposite to the arrow Y5a. Even in this loop path, like the above, an optical signal of C-band on the long-wavelength side Ca (which may also be referred to as long-wavelength side optical signal Ca) is newly generated due to the four light-wave mixing processing.

Two long-wavelength side optical signals Ca having followed the above-described loop path bidirectionally and generated are wavelength-multiplexed by the polarization beam splitter 57a and are output toward the input side, as indicated by an arrow Y7a, and then extracted by the WDM coupler 56a and output to the optical coupler 60.

Even on the short wavelength side, wavelength band conversion processing is performed in the same manner as on the above-described long-wavelength side. That is, the long-wavelength side optical signal Lb and the pump beam Pb input to the polarization beam splitter 57b are output from the first input/output port 57b1 of the polarization beam splitter 57b and are input to the second input/output port 57b2 following the loop path passing through the polarization controller 58b and the high nonlinear fiber 59b, as indicated by an arrow Y5b.

In this loop path, the long-wavelength side optical signal Lb and the pump beam Pb output from the first input/output port 57b1 are subjected to the four light-wave mixing processing in the high nonlinear fiber 59b while they are polarization controlled by the polarization controller 58b. Through this processing, a short-wavelength side optical signal Cb of C-band is newly generated and input to the second input/output port 57b2 of the polarization beam splitter 57b together with the long-wavelength side optical signal Lb and the pump beam Pb.

At the same time as this operation, the long-wavelength side optical signal Lb and the pump beam Pb follow the loop path indicated by an arrow Y6b opposite to the arrow Y5b from the second input/output port 57b2 of the polarization beam splitter 57b. Even in this loop path, like the above, an optical signal of C-band on the short wavelength side Cb (which may also be referred to as short-wavelength side optical signal Cb) is newly generated due to the four light-wave mixing processing.

Two short-wavelength side optical signals Cb having followed the above-described loop path bidirectionally and generated are wavelength-multiplexed by the polarization beam splitter 57b and are output toward the input side, as indicated by an arrow Y7b, and then output to the optical coupler 60 via the WDM coupler 56b.

The optical coupler 60 combines the long-wavelength side optical signal Ca and the short-wavelength side optical signal Cb to obtain a C-band optical signal. As described above, the L/C conversion unit 32 converts the L-band optical signal from the demultiplexer 11a into the C-band optical signal. This converted C-band optical signal is input to the optical amplifier 24a of the C-band WXC unit 22.

Operations of Embodiment

Next, operations of the multiband transmission system 10A will be described with reference to a flowchart of FIG. 3.

Figure 3:
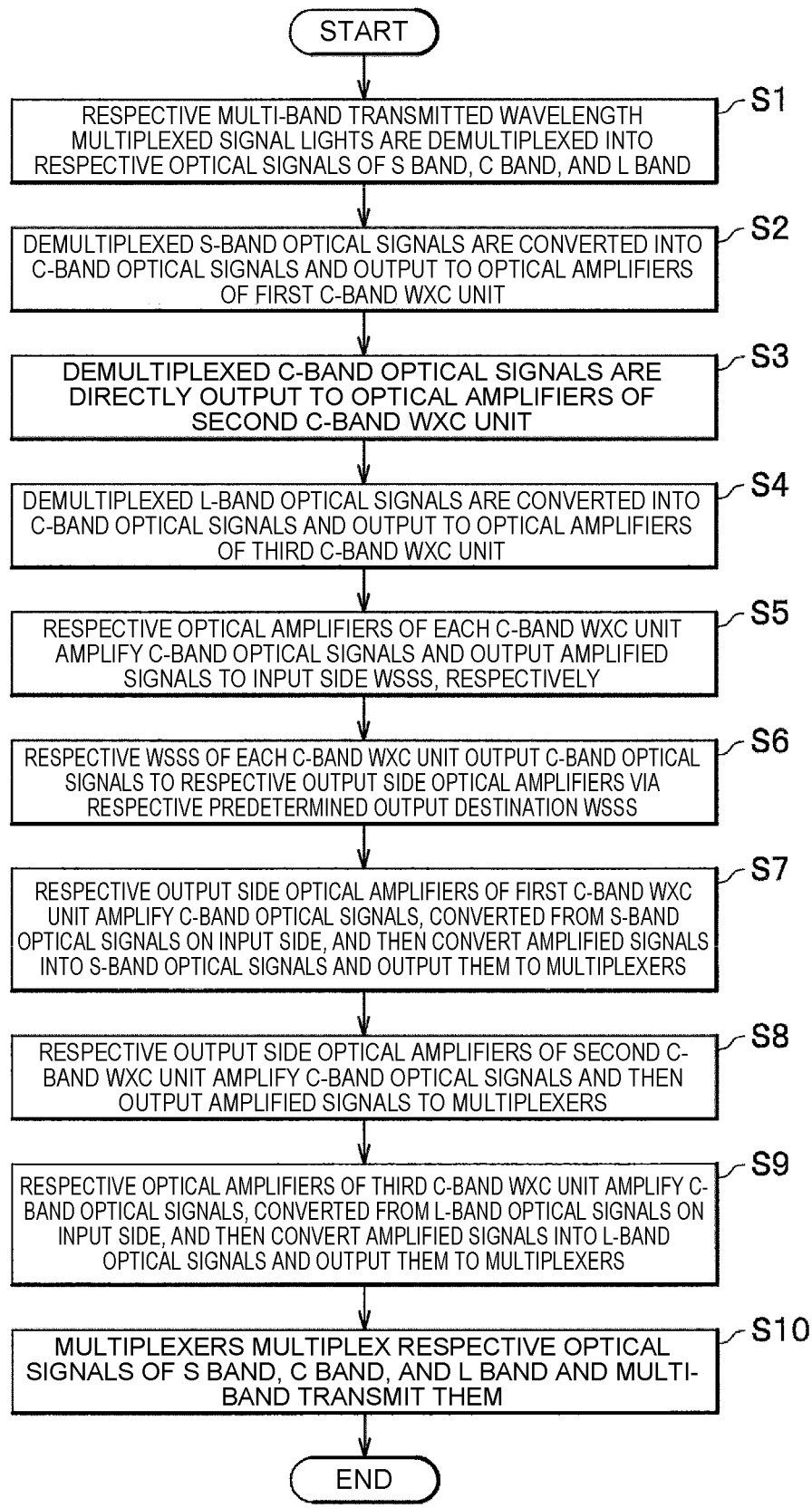
FIG. 3 is a flowchart illustrating an operation of the multiband transmission system of the embodiment.

In step S1 illustrated in FIG. 3, the wavelength multiplexed signal lights ha to 1m multiband transmitted from the route M(1) on the input side illustrated in FIG. 1 are demultiplexed into respective optical signals of S band, C band, and L band, for each of the wavelength multiplexed signal lights ha to 1m, by respective demultiplexers 11a to 11m.

In step S2, the above-described demultiplexed S-band optical signals are converted into the C-band optical signals by respective S/C conversion units 31 and output to the optical amplifiers 24b to 24m of the first C-band WXC unit 22.

In step S3, the above-described demultiplexed C-band optical signals are directly output to the optical amplifiers 24a to 24m of the second C-band WXC unit 22.

In step S4, the above-described demultiplexed L-band optical signals are converted into C-band optical signals by respective L/C conversion units 32 and output to the optical amplifiers 24b to 24m of the third C-band WXC unit 22. The execution order of the above-described processing of steps S2 to S4 is not limited particularly.

In step S5, respective optical amplifiers 24a to 24m of each C-band WXC unit 22 amplify the C-band optical signals and output the amplified signals to the WSSs 25a to 25m, respectively.

In step S6, respective WSSs 25a to 25m of each C-band WXC unit 22 output the input C-band optical signals to the optical amplifiers 27a to 27m via predetermined output side WSSs 26a to 26m.

In step S7, respective optical amplifiers 27a to 27m of the first C-band WXC unit 22 on the output side amplify the C-band optical signals converted by the S/C conversion unit 31 on the input side, and output the amplified signals to the C/S conversion units 35. The C/S conversion units 35 convert the C-band optical signals having been converted on the input side into the S-band optical signals, and output the converted signals to the multiplexers 12a to 12m.

In step S8, the optical amplifiers 27a to 27m of the second C-band WXC unit 22 amplify the C-band optical signals and directly output the amplified signals to respective multiplexers 12a to 12m.

In step S9, respective optical amplifiers 27a to 27m of the third C-band WXC unit 22 on the output side amplify the C-band optical signals converted by the L/C conversion units 32 on the input side, and output the amplified signals to the C/L conversion units 36. The C/L conversion units 36 convert the C-band optical signals having been converted on the input side into the L-band optical signals and output the converted signals to the multiplexers 12a to 12m. The execution order of the above-described processing of steps S7 to S9 is not limited particularly.

In step S10, respective multiplexers 12a to 12m multiplex the respective input optical signals of S band, C band, and L band and multiband transmit the multiplexed signals to the M routes M(2) on the output side.

<Effects of Embodiment>

The wavelength cross-connect device 20A of the present embodiment performs relay processing, the relay processing being such that wavelength multiplexed signal lights 1a to 1m, which are multiband transmitted from a plurality of routes M(1) each including one or a plurality of optical fibers bundled in one route M(1), are demultiplexed into different wavelength bands (S band, C band, and L band), and for each route, respective optical signals of the different wavelength bands (S band, C band, and L band) are amplified, then subject to route change by WSSs and outputted to output side routes M(2).

(1) The wavelength cross-connect device 20A includes the C-band WXC units 22 that are the same in total number as the wavelength bands of the optical signals of respective wavelength bands, have the optical amplifiers 24b to 24m and 27a to 27m and the WSSs 25a to 25m and 26a to 26m, and perform the relay processing on the optical signals of the predetermined specific wavelength band (C band) of the different wavelength bands. Further, the wavelength cross-connect device 20A includes the input side conversion units (the S/C conversion units 31 and the L/C conversion units 32) provided on the input side of the C-band WXC units 22 for converting the optical signals of the wavelength bands other than the specific wavelength band into the optical signals of the specific wavelength band, and includes the output side conversion units (the C/S conversion units 35 and the C/L conversion units 36) provided on the output side of the C-band WXC units 22 for converting the optical signals of the specific wavelength band converted by the input side conversion units into the before-conversion optical signals. It is configured that the optical signals of the specific wavelength band directly input from the input side are directly output after relay processing by the C-band WXC units 22.

According to this configuration, the number of the C-band WXC units 22 that perform the relay processing on the optical signals of the specific wavelength band is the same as the number of the wavelength bands of respective optical signals demultiplexed into the different wavelength bands on the input side of the C-band WXC units 22. The input side optical signals of the wavelength bands other than the specific wavelength band are converted into the optical signals of the specific wavelength band by the input side conversion units, and input to the C-band WXC units 22 relating to the wavelength bands other than the specific wavelength band. Further, the input side optical signals of the specific wavelength band are directly input to the C-band WXC units 22 relating to the specific wavelength band. For this reason, all the C-band WXC units 22 perform the relay processing on the optical signals of the specific wavelength band, which is the same wavelength band.

When the optical signals of the specific wavelength band after the relay processing are the optical signals converted by the input side conversion units, they are converted into the before-conversion optical signals by the output side conversion units. The optical signals of the specific wavelength band directly input from the input side are directly output after the relay processing by the C-band WXC units 22.

Therefore, all the C-band WXC units 22 have the same optical properties because they have the function of processing the optical signals of the same wavelength band (specific wavelength band). In other words, all the C-band WXC units 22 are free from differences in optical properties that may occur due to differences of wavelength bands as in the conventional multiband transmission.

Conventionally, it was necessary to make respective C-band WXC units 22 cope with optical signal processing in different wavelength bands. On the other hand, in the present invention, the optical signal processing can be performed in the same wavelength band (specific wavelength band). For this reason, components such as electrical components and mechanical components can be shared and the C-band WXC units 22 can be reduced in device scale and power consumption.

Further, in all the C-band WXC units 22 of the present invention, the optical signals of the same wavelength band are input and output. Therefore, in all the C-band WXC units 22, it is possible to eliminate the possibility that the transmission performances of other C-band WXC units 22 may be limited by each C-band WXC unit 22 as in the conventional one, by the S-band WXC unit 21 (FIG. 6) relating to the wavelength band that lowers the technical maturity level of the constituent elements (WSSs 25a to 25m and 26a to 26m and the optical amplifiers 24b to 24m and 27a to 27m). That is, the realization time of the multiband compliant WXC can be prevented from being rate-determined by the optical device of the wavelength band (S band) that requires the most technical maturity period.

(2) The specific wavelength band is configured to be a wavelength band (C band) that maximizes the technical maturity level, which is one of wavelength bands that differentiate the technical maturity level of constituent elements relating to transmission performances of the C-band WXC unit 22.

According to this configuration, since all the C-band WXC units 22 are configured to have constituent elements relating to the specific wavelength band that maximizes the technical maturity level, all the C-band WXC units 22 can be unified so as to have the function of maximizing transmission performances.

Modified Example 1 of Embodiment

Figure 4:
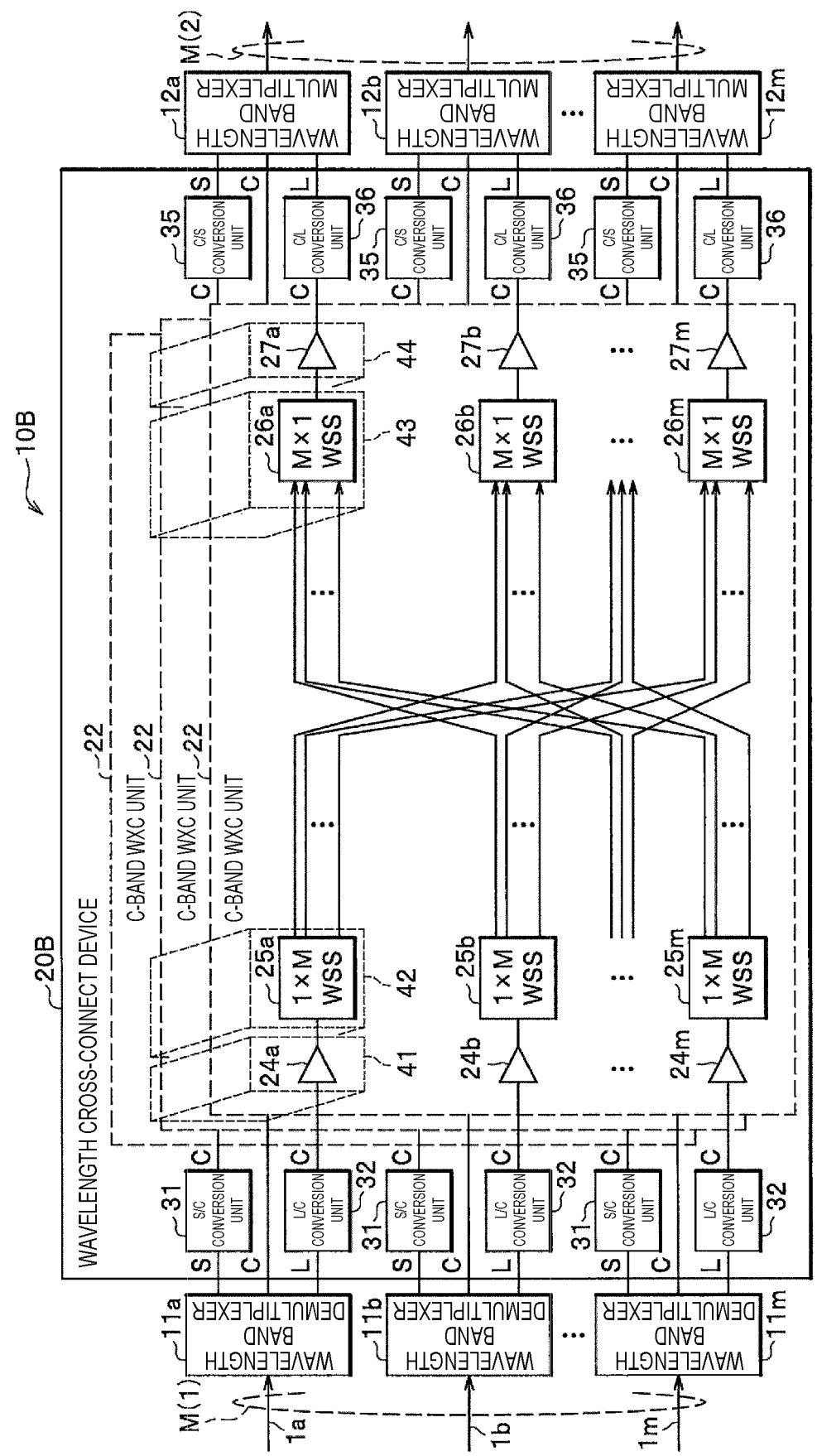
FIG. 4 is a block diagram illustrating the configuration of a multiband transmission system using a wavelength cross-connect device according to a modified example 1 of the embodiment.

FIG. 4 is a block diagram illustrating the configuration of a multiband transmission system using a wavelength cross-connect device according to a modified example 1 of the embodiment of the present invention.

The wavelength cross-connect device 20B of the modified example 1 illustrated in FIG. 4 is similar to the wavelength cross-connect device 20A (FIG. 1) of the above-described embodiment in that three C-band WXC units 22 include various functional constituent elements such as M optical amplifiers 24a to 24m and M WSS 25a to 25m on the input side and M WSSs 26a to 26m and M optical amplifiers 27a to 27m on the output side.

The wavelength cross-connect device 20B is characterized in that various functional constituent elements in the three C-band WXC units 22 are configured in such a manner that the same type constituent elements on the input side or the output side are bundled in one and are realized as a device with one housing (referred to as a housing device).

That is, as indicated by a short dashes line frame 41, three optical amplifiers 24a, each being arranged for one of the three C-band WXC units 22, are configured to be bundled in one (or configured in an array) on the input side, so as to provide one optical amplifier device (referred to as optical amplifier device 41) that is one housing device. Similarly, regarding other optical amplifiers 24b to 24m, three optical amplifiers of the three C-band WXC units 22 are configured to be bundled in one so as to provide one optical amplifier device 41.

Like the above, as indicated by a short dashes line frame 42, three WSSs 25a, each being arranged for one of the three C-band WXC units 22, are configured to be bundled in one on the input side so as to provide one WSS device (referred to as WSS device 42). Similarly, regarding other WSSs 25b to 25m, three WSSs of the three C-band WXC units 22 are configured to be bundled in one so as to provide one WSS device 42.

The same applies to the output side. That is, three WSSs 26a of the three C-band WXC units 22 are configured to be bundled in one so as to provide one WSS device 43 indicated by a short dashes line frame. Similarly, regarding other WSSs 26b to 26m, three WSSs are configured to be bundled in one so as to provide one WSS device 43.

Further, three optical amplifiers 27a on the output side of three C-band WXC units 22 are configured to be bundled in one so as to provide one optical amplifier device 44 indicated by a short dashes line frame. Similarly, regarding other optical amplifiers 27a to 27m, three optical amplifiers are configured to be bundled in one so as to provide one optical amplifier device 44.

As described above, various functional constituent elements of all the C-band WXC units 22 represented by the optical amplifiers 24b to 24m and 27a to 27m and the WSS 25a to 25m and 26a to 26m are realized as the housing devices 41 to 44 in which elements of the same type are configured to be bundled in one over all the C-band WXC units 22. In this case, since the components such as electrical components and mechanical components can be shared, the scale can be reduced and also the power consumption can be reduced, compared to a case where three C-band WXC units 22 are simply combined.

Modified Example 2 of Embodiment

Figure 5:
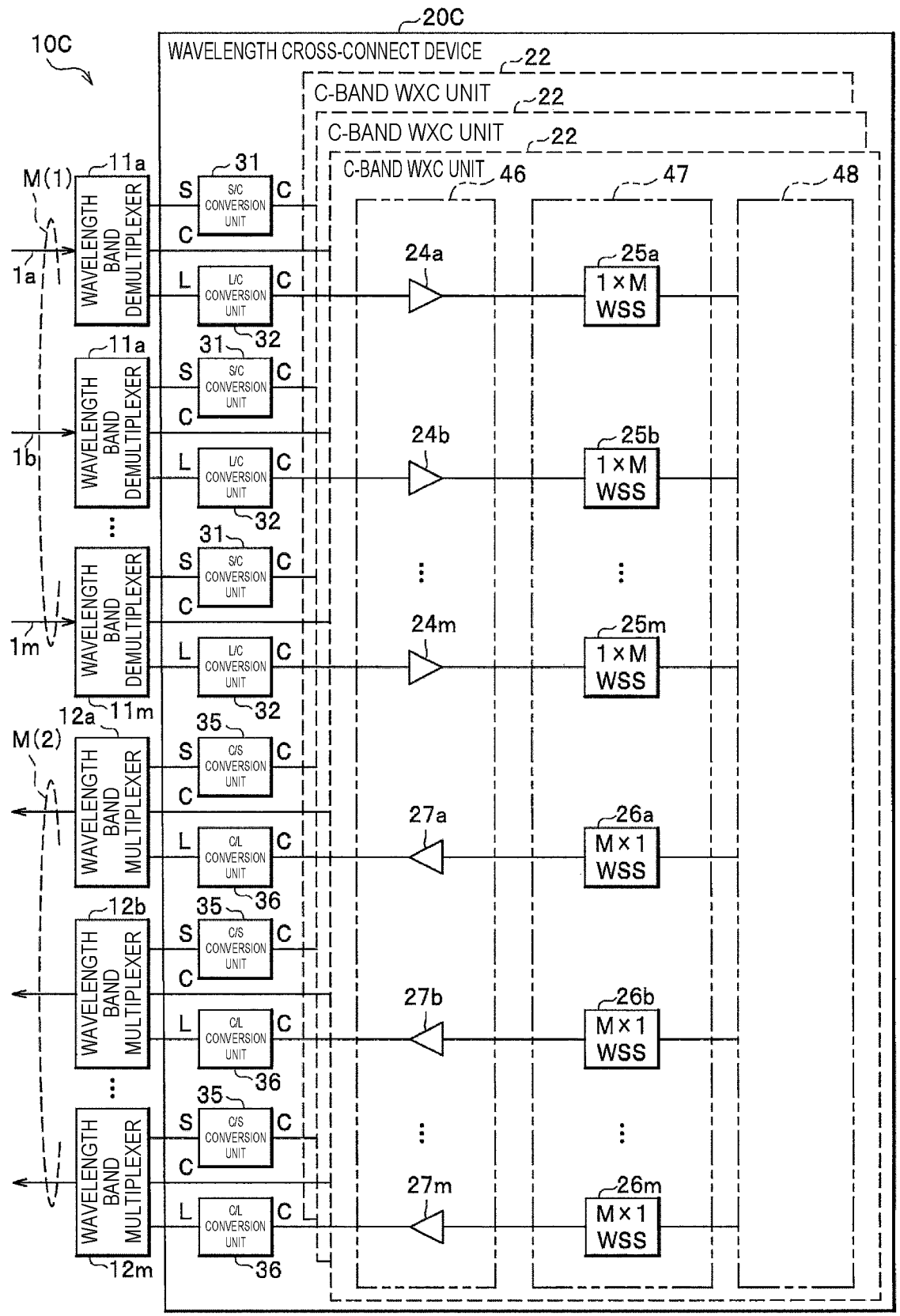
FIG. 5 is a block diagram illustrating the configuration of a multiband transmission system using a wavelength cross-connect device according to a modified example 2 of the embodiment.

FIG. 5 is a block diagram illustrating the configuration of a multiband transmission system using a wavelength cross-connect device according to a modified example 2 of the embodiment of the present invention.

The wavelength cross-connect device 20B of the multiband transmission system 20C of the modified example 2 illustrated in FIG. 5 is characterized in that the constituent elements of the same type on the input side and the output side are configured to be bundled in one and are realized as one housing device, for each of three C-band WXC units 22.

That is, as indicated by an alternate long and two short dashes line frame 46, in the C-band WXC unit 22 to which the L/C conversion units 32 on the input side are connected, M optical amplifiers 24a to 24m on the input side and M optical amplifiers 27a to 27m on the output side are configured to be bundled in one (or configured in an array) so as to provide an optical amplifier device (referred to as optical amplifier device 46) that is one housing device.

As indicated by an alternate long and two short dashes line frame 47, in the C-band WXC unit 22 to which the L/C conversion units 32 on the input side are connected, M WSSs 25a to 25m on the input side and M WSSs 26a to 26m on the output side are configured to be bundled in one so as to provide one WSS device (referred to as WSS device 47).

Similarly, in the C-band WXC unit 22 to which output terminals of the demultiplexers 11a to 11m on the input side are directly connected, the optical amplifiers 24a to 24m on the input side and the optical amplifiers 27a to 27m on the output side are configured to be bundled in one so as to provide one optical amplifier device 46.

Further, in the C-band WXC unit 22 to which output terminals of the demultiplexers 11a to 11m on the input side are directly connected, M WSSs 25a to 25m on the input side and M WSSs 26a to 26m on the output side are configured to be bundled in one so as to provide one WSS device 47.

Similarly, in the C-band WXC unit 22 to which the S/C conversion units 31 on the input side are connected, the optical amplifiers 24b to 24m on the input side and the optical amplifiers 27a to 27m on output side are configured to be bundled in one so as to provide one optical amplifier device 46.

Further, in the C-band WXC unit 22 to which the S/C conversion units 31 on the input side are connected, the WSSs 25a to 25m on the input side and the WSSs 26a to 26m on output side are configured to be bundled in one so as to provide one WSS device 47.

An alternate long and two short dashes line frame 48 connected between output terminals of the WSSs 25a to 25m on the input side and input terminals of the WSSs 26a to 26m on the output side indicates the presence of optical wiring that is the same in arrangement as the optical wiring surrounded by the alternate long and two short dashes line frame 48 in FIG. 1. That is, the output terminals of the WSSs 25a to 25m on the input side and the input terminals of the WSSs 26a to 26m on the output side are connected by the optical wiring indicated by the alternate long and two short dashes line frame 48.

As described above, when the constituent elements of the same type on the input side and the output side are configured to be bundled in one and are realized as one housing device, for each of the three C-band WXC units 22, the components such as electrical components and mechanical components can be shared. For this reason, the scale can be reduced and also the power consumption can be reduced, compared to a case where three constituent elements are simply combined.

Each of all the C-band WXC units 22 is configured to include the housing devices 46 and 47 in which, with respect to various functional constituent elements represented by the optical amplifiers 24b to 24m and 27a to 27m and the WSSs 25a to 25m and 26a to 26m, constituent elements of the same type are configured to be bundled in one.

According to this configuration, for each of all the C-band WXC units 22, the constituent elements of the same type on the input side and the output side are configured to be bundled in one and realized as the single-housing devices 46 and 47. In this case, the components such as electrical components and mechanical components can be shared. For this reason, the scale can be reduced and also the power consumption can be reduced, compared to a case where the three C-band WXC units 22 are simply combined.

<Effect>

(1a) The wavelength cross-connect device of the present invention is provided wherein the wavelength cross-connect device performs relay processing, the relay processing being such that wavelength multiplexed signal lights, in which optical signals of a plurality of different wavelength bands are multiplexed and which are multiband transmitted via the optical transmission line configured by one or a plurality of optical fibers, are demultiplexed into different wavelength bands, and for each route, respective optical signals of the different wavelength bands are amplified, then subject to route change by WSSs (Wavelength Selective Switches) and outputted to output side routes; the wavelength cross connect device includes WXC (Wavelength Cross Connect) units that are the same in total number as the wavelength bands of the optical signals of respective wavelength bands, have the optical amplifiers and the WSSs, and perform the relay processing on the optical signals of a predetermined specific wavelength band of the different wavelength bands, includes input side conversion units provided on the input side of the WXC units for converting optical signals of wavelength bands other than the specific wavelength band into the optical signals of the specific wavelength band, includes output side conversion units provided on the output side of the WXC units for converting the optical signals of the specific wavelength band converted by the input side conversion units into before-conversion optical signals, and the optical signals of the specific wavelength band directly input from the input side are directly output after relay processing by the WXC unit.

According to this configuration, the number of the WXC units that perform the relay processing on the optical signals of the specific wavelength band is the same as the number of the wavelength bands of respective optical signals demultiplexed into the different wavelength bands on the input side of the WXC units. The input side optical signals of the wavelength bands other than the specific wavelength band are converted into the optical signals of the specific wavelength band by the input side conversion units, and input to the WXC units relating to the wavelength bands other than the specific wavelength band. Further, the input side optical signals of the specific wavelength band are directly input to the WXC units relating to the specific wavelength band. For this reason, all the WXC units performs the relay processing on the optical signals of the specific wavelength band, which is the same wavelength band. When the optical signals of the specific wavelength band after the relay processing are the optical signals converted by the input side conversion units, they are converted into the before-conversion optical signals by the output side conversion units. The optical signals of the specific wavelength band directly input from the input side are directly output after the relay processing by the WXC units.

Therefore, all the WXC units have the same optical properties because they have the function of processing the optical signals of the same wavelength band (specific wavelength band). In other words, all the WXC units are free from differences in optical properties that may occur due to differences of wavelength bands as in the conventional multiband transmission.

Conventionally, it was necessary to make respective WXC units cope with optical signal processing in different wavelength bands. On the other hand, in the present invention, the optical signal processing can be performed in the same wavelength band (specific wavelength band). For this reason, the components such as electrical components and mechanical components can be shared and the WXC units can be reduced in device scale and power consumption.

Further, in all the WXC units of the present invention, the optical signals of the same wavelength band are input and output. Therefore, in all the WXC units, it is possible to eliminate the possibility that the transmission performance of other WXC units may be limited by the WXC unit relating to the wavelength band that lowers the technical maturity level of the constituent elements (the WSSs and the optical amplifiers) in each WXC unit as in the conventional one. That is, in the present invention, the realization time of the multiband compliant WXC can be prevented from being rate-determined by the optical device of the wavelength band that requires the most technical maturity period.

(2a) In the above-described (1a), it is characterized that the specific wavelength band is a wavelength band that maximizes the technical maturity level, which is one of wavelength bands that differentiate the technical maturity level of constituent elements relating to transmission performances of the WXC units.

According to this configuration, since all the WXC units are configured to have constituent elements relating to the specific wavelength band that maximizes the technical maturity level, all the WXC units can be unified so as to have the function of maximizing the transmission performances.

(3a) In the above-described (1a) or (2a), it is characterized by including the housing devices in which various functional constituent elements of the WXC units represented by the respective optical amplifiers and the WSSs are configured in such a manner that elements of the same type are bundled in one over all the WXC units.

According to this configuration, for example, when the total number of all the WXC units is three, a total of three constituent elements each being provided for one of the three WXC units are bundled in one and configured as one housing device. In this housing device, the components such as electrical components and mechanical components, which are the three constituent elements, can be shared. For this reason, in one housing device, the scale can be reduced and also the power consumption can be reduced compared to a case where three WXC units are simply combined.

(4a) In the above-described (1a) or (2a), it is characterized by including the housing devices in which various functional constituent elements represented by the optical amplifiers and the WSSs are configured in such a manner that elements of the same type are bundled in one, for each WXC unit.

According to this configuration, when the constituent elements of the same type on the input side and the output side are configured to be bundled in one and realized as one housing device, for each of all the WXC units, the components such as electrical components and mechanical components can be shared. For this reason, the scale can be reduced and also the power consumption can be reduced, compared to a case where the three WXC units are simply combined.

In addition, concrete configurations can be changed appropriately without departing from the gist of the present invention.

REFERENCE SIGNS LIST 1a to 1m Wavelength multiplexed signal light
11a to 11m Wavelength band demultiplexer
12a to 12m Wavelength band multiplexer
20A, 20B, 20C Wavelength cross-connect device
22 C-band WXC unit
24b to 24m and 27a to 27m Optical amplifier
25a to 25m and 26a to 26m WSS
31 S/C conversion unit
32 L/C conversion unit
35 C/S conversion unit
36 C/L conversion unit
41 to 44, 46, and 47 Housing device

The invention claimed is:

1. A wavelength cross-connect device,
wherein the wavelength cross-connect device performs relay processing, the relay processing being such that wavelength multiplexed signal lights, in which optical signals of a plurality of different wavelength bands are multiplexed and which are multiband transmitted from a plurality of routes via an optical transmission line configured by one or a plurality of optical fibers, are demultiplexed into different wavelength bands, and for each route, respective optical signals of the different wavelength bands are amplified, then subject to route change by WSSs (Wavelength Selective Switches) and outputted to output side routes;
the wavelength cross-connect device comprises:
WXC (Wavelength Cross Connect) units that are the same in total number as the wavelength bands of the optical signals of respective wavelength bands, have optical amplifiers and the WSSs, and perform the relay processing on the optical signals of a predetermined specific wavelength band of the different wavelength bands;
input side conversion units provided on an input side of the WXC units for converting optical signals of wavelength bands other than the specific wavelength band into optical signals of the specific wavelength band;
output side conversion units provided on an output side of the WXC units for converting the optical signals of the specific wavelength band converted by the input side conversion units into before-conversion optical signals; and
housing devices in which various functional constituent elements of the WXC units represented by respective optical amplifiers and the WSSs are configured in such a manner that elements of the same type are bundled in one over all the WXC units; and
wherein the optical signals of the specific wavelength band directly input from the input side of the WXC units are directly output after the relay processing by the WXC units.

2. The wavelength cross-connect device according to claim 1, wherein the specific wavelength band is a wavelength band that maximizes a technical maturity level, which is one of wavelength bands that differentiate the technical maturity level of constituent elements relating to transmission performances of the WXC units.

3. The wavelength cross-connect device according to claim 2, wherein comprising housing devices in which various functional constituent elements represented by the optical amplifiers and the WSSs are configured in such a manner that elements of the same type are bundled in one, for each WXC unit.

4. A wavelength cross-connect method by a wavelength cross-connect device, wherein the wavelength cross-connect device performs relay processing, the relay processing being such that wavelength multiplexed signal lights, which are multiband transmitted from a plurality of routes each including a plurality of optical fibers bundled in one route, are demultiplexed into different wavelength bands, and for each route, respective optical signals of the different wavelength bands are amplified, then subject to route change by WSSs and outputted to output side routes,
the wavelength cross-connect device WXC units that are the same in total number as the wavelength bands of the optical signals of respective wavelength bands, have optical amplifiers and the WSSs, and perform the relay processing on the optical signals of a predetermined specific wavelength band of the different wavelength bands,
the wavelength cross-connect method comprises:
converting the optical signals of the wavelength bands other than the specific wavelength band into optical signals of the specific wavelength band on an input side of the WXC units;
converting the converted optical signals of the specific wavelength band into before-conversion optical signals on an output side of the WXC units;
configuring, the WXC units represented by respective optical amplifiers and the WSSs in housing devices, in a manner that elements of the same type are bundled in one over all the WXC units; and
directly outputting the optical signals of the specific wavelength band directly input to the WXC units after the relay processing by the WXC units.

5. The wavelength cross-connect method according to claim 4, wherein the specific wavelength band is a wavelength band that maximizes a technical maturity level, which is one of wavelength bands that differentiate the technical maturity level of constituent elements relating to transmission performances of the WXC units.

6. The wavelength cross-connect method according to claim 5, further comprising:
configuring, the WXC units represented by respective optical amplifiers and the WSSs in housing devices, in a manner that elements of the same type are bundled in one, for each WXC unit.

* * * * *